(12) United States Patent
Zhou et al.

(10) Patent No.: US 10,971,951 B2
(45) Date of Patent: Apr. 6, 2021

(54) ELECTRONIC SYSTEM HAVING POWER ADAPTER FOR WIRED AND WIRELESS CHARGING

(71) Applicant: INTEL CORPORATION, Santa Clara, CA (US)

(72) Inventors: Shaorong Zhou, Shanghai (CN); Songnan Yang, San Jose, CA (US); Hong W. Wong, Portland, OR (US); Peipei Ding, Taipei (TW); Xiaoguo Liang, Shanghai (CN); Ze An Xia, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 15/779,508

(22) PCT Filed: Dec. 24, 2015

(86) PCT No.: PCT/US2015/000455
§ 371 (c)(1),
(2) Date: May 25, 2018

(87) PCT Pub. No.: WO2017/111859
PCT Pub. Date: Jun. 29, 2017

(65) Prior Publication Data
US 2018/0351405 A1    Dec. 6, 2018

(51) Int. Cl.
*H02J 50/12* (2016.01)
*H02J 7/00* (2006.01)
*H02J 7/02* (2016.01)

(52) U.S. Cl.
CPC .......... *H02J 50/12* (2016.02); *H02J 7/00* (2013.01); *H02J 7/025* (2013.01); *H02J 2207/20* (2020.01)

(58) Field of Classification Search
CPC ........................................... H02J 7/50
(Continued)

(56) References Cited

U.S. PATENT DOCUMENTS

2011/0018360 A1* 1/2011 Baarman ............... H02J 7/0027
                                                      307/104
2011/0050164 A1   3/2011 Partovi et al.
(Continued)

OTHER PUBLICATIONS

International Search Report and Written Opinion, dated Sep. 12, 2016, issued in related International Application No. PCT/US2015/000455, 12 pages.

*Primary Examiner* — Robert Grant
(74) *Attorney, Agent, or Firm* — Schwabe, Williamson & Wyatt, P.C.

(57) ABSTRACT

A universal power adapter may be provided to provide both a wireless charging signal and a DC signal for wired charging. The universal power adapter may include an AC/DC converter device, a first power circuit, a second power circuit, and a jack to provide a wireless charging signal and a DC signal. The AC/DC converter device to provide a DC signal based on an AC signal received from an external power source. The first power circuit to receive the DC signal and to provide a wireless charging signal based on the DC signal. The second power circuit to receive the DC signal and to provide a DC signal based on the DC signal. The jack may provide both the wireless charging signal and the DC signal.

17 Claims, 8 Drawing Sheets

(58) Field of Classification Search
USPC .......................................................... 320/108
See application file for complete search history.

(56) References Cited

U.S. PATENT DOCUMENTS

| | | |
|---|---|---|
| 2013/0278207 A1 | 10/2013 | Yoo |
| 2013/0285601 A1* | 10/2013 | Sookprasong .......... H02J 50/10 320/108 |
| 2015/0028800 A1 | 1/2015 | Kim |

* cited by examiner

ELECTRONIC SYSTEM HAVING POWER ADAPTER FOR WIRED AND WIRELESS CHARGING

CROSS REFERENCE TO RELATED APPLICATIONS

The present application is a national phase entry under 35 U.S.C. § 371 of International Application No. PCT/US2015/000455, filed Dec. 24, 2015, entitled "ELECTRONIC SYSTEM HAVING POWER ADAPTER FOR WIRED AND WIRELESS CHARGING," which designates the United States of America, the entire disclosure of which is hereby incorporated by reference in its entirety and for all purposes.

BACKGROUND

1. Field

Embodiments may relate to a universal power adapter for wired charging and wireless charging.

2. Background

A wireless charger may provide a charging mechanism for charging one or more compatible devices. The compatible device may be an a4wd device, for example. The wireless charger may be connected to a power source, but may provide a wireless charge to an electronic device (or apparatus) when the device (or apparatus) is provided on top of the wireless charger or is in close proximity to the wireless charger.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
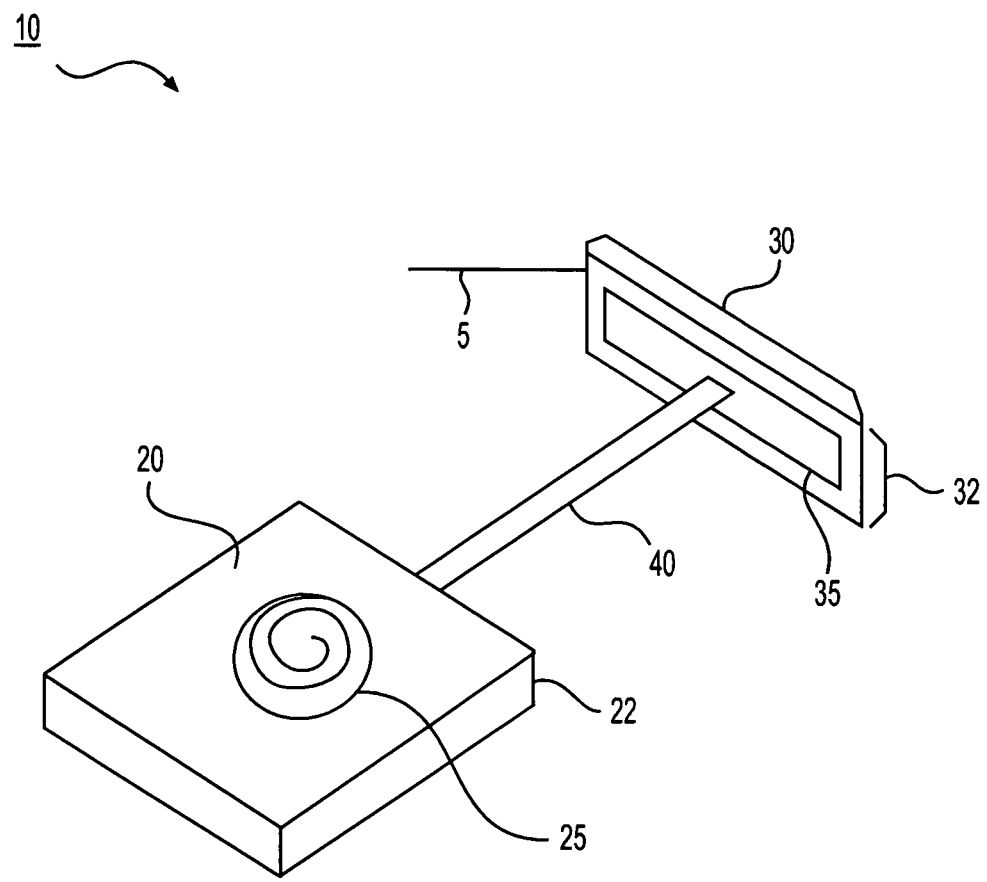
FIG. 1 shows a wireless charging system according to an example embodiment.

In the following description, numerous specific details may be set forth. However, it is understood that embodiments may be practiced without these specific details. In other instances, well-known circuits, structures and techniques have not been shown in detail in order not to obscure an understanding of this description.

References to "one embodiment," "an embodiment," "example embodiment," "various embodiments," etc., indicate that embodiments may include particular features, structures, or characteristics, but not every embodiment necessarily includes the particular features, structures, or characteristics. Further, some embodiments may have some, all, or none of the features described for other embodiments. Features from one embodiment may be combined with features of other embodiments.

As used hereinafter, the words "wireless power" may be used to relate to any form of energy associated with electric fields, magnetic fields, electromagnetic fields, or otherwise that is transmitted from a transmitting device to a receiving device without use of physical conductors.

Wireless charging may include charging of an electronic device (or electronic apparatus). The electronic device may any one of a wide variety of battery powered devices including mobile terminals, such as personal digital assistants (PDAs), pagers, mobile televisions, mobile telephones, smartphones, gaming devices, laptop computers, tablet computers, cameras, camera phones, video recorders, audio/video players, radios, global positioning system (GPS) devices, navigation devices, and/or any combination of the aforementioned.

Wireless charging may include a wireless charging mat (or pad). The electronic device (or apparatus) may be physically provided on the mat (or pad) in order to receive a wireless charge from the wireless charging mat. For example, the wireless charging mat (or pad) may provide (or deliver) 20 Watts (W) or more to the electronic device physically provided on the mat.

The wireless charging mat may include an induction coil and a power transmitting unit (PTU) circuit board. The PTU circuit board may be referred to as a controller board or circuit board. The PTU circuit board may control power to the induction coil. The PTU circuit board may control a power transmission frequency (such as 6.78 MHz) of a signal to be provided to the induction coil.

In disadvantageous arrangements, the induction coil and the PTU circuit board may be physically provided within a single chassis (or one piece chassis). When the induction coil and the PTU circuit board are provided together in the one piece chassis, then the PTU circuit board may be horizontally provided. The X-Y dimensions of the wireless charging mat may be rather large. In one example, the X-Y dimensions may be 400 mm×450 mm. However, the one-piece chassis may include an increased thickness (or bump) at or near the PTU circuit board. This may result in an increased thickness (or Z-height). An increased thickness may be undesirable.

Embodiments may provide a wireless charging system (or electronic system) having a split form factor design. For example, the wireless charging system may include a PTU charging module and a PTU circuit module. The PTU charging module may include an induction coil within a chassis (or first structure), and the PTU circuit module may include a PTU circuit board within a second chassis (or second structure). The PTU charging module may be physically separated from the PTU circuit module. This may be advantageous.

FIG. 1 shows a wireless charging system according to an example embodiment. Other embodiments and configurations may also be provided.

FIG. 1 shows a wireless charging system 10 that includes a PTU charging module 20 (or first structure), a PTU circuit module 30 (or second structure) and a connector 40. The circuit module 30 may also be called a controller module. As shown in FIG. 1, the charging module 20 is physically separated from the circuit module 30. The charging module 20 may be connected to the circuit module 30 by the connector 40. The connector 40 may be a cable that provides an electrical connection between the charging module 20 and the circuit module 30.

The charging module 20 may be a charging mat or a charging pad. The charging module 20 may include a chassis 22 (or first structure) and a charging coil 25 (or induction coil). The chassis 22 may be a plastic structure that physically supports the charging coil 25. The chassis 22 may be provided around the coil. For example, the chassis may include a top surface (on a top side of the coil) and a bottom surface (on a bottom side of the coil). An electronic device may be provided on the top surface of the chassis (or charging mat) in order to be provided within a wireless charging field.

The circuit module 30 may include a chassis 32 (or second structure) and a circuit board 35 provided within the chassis 32. The circuit board 35 may be a PTU circuit board that performs functions of wireless charging. The circuit board 35 may contain power conversion circuits (such as a rectifier and an inverter) to convert an alternate current/direct current (AC/DC) input to a signal at a proper power transmission frequency in order to provide wireless charging. The circuit board may also include control circuits such as a micro controller, a communication circuit such as Bluetooth low energy (BLE), Wi-Fi, etc. The circuit board may receive an input signal 5 from an external power supply.

In at least one embodiment, the circuit module (or controller module) may be vertically provided such that the circuit board 35 is vertically provided (and not horizontally provided). This may provide better convection cooling.

The connector 40 may be a shielded cable that connects the circuit board 35 (at the circuit module 30) and the charging coil 25 (at the charging mat). As one example, the cable may be a lead wire, for example. The cable may be retractable such that an exposed length of the cable may vary based on a distance between the circuit module 30 and the charging module 20.

The split formation of the wireless charging system may have advantages over a charging system provided within a single chassis. For example, since the circuit module 30 and the charging module 20 are physically separated from each other, proper placement of the components may be beneficial. For example, the circuit module 30 may be provided at a non-visible location (such as under a table) while the charging module 20 may be provided at a visible location (such as on a table). Additionally, the split formation of the wireless charging system may result in a thinner charging module 20 (since the PTU circuit board is separately located). Due to the physical separation of the charging module 20 and the circuit module 30, each of the charging module 20 and the circuit module 30 may be physically designed to be physically separated or to be independent from the other.

Figure 2:
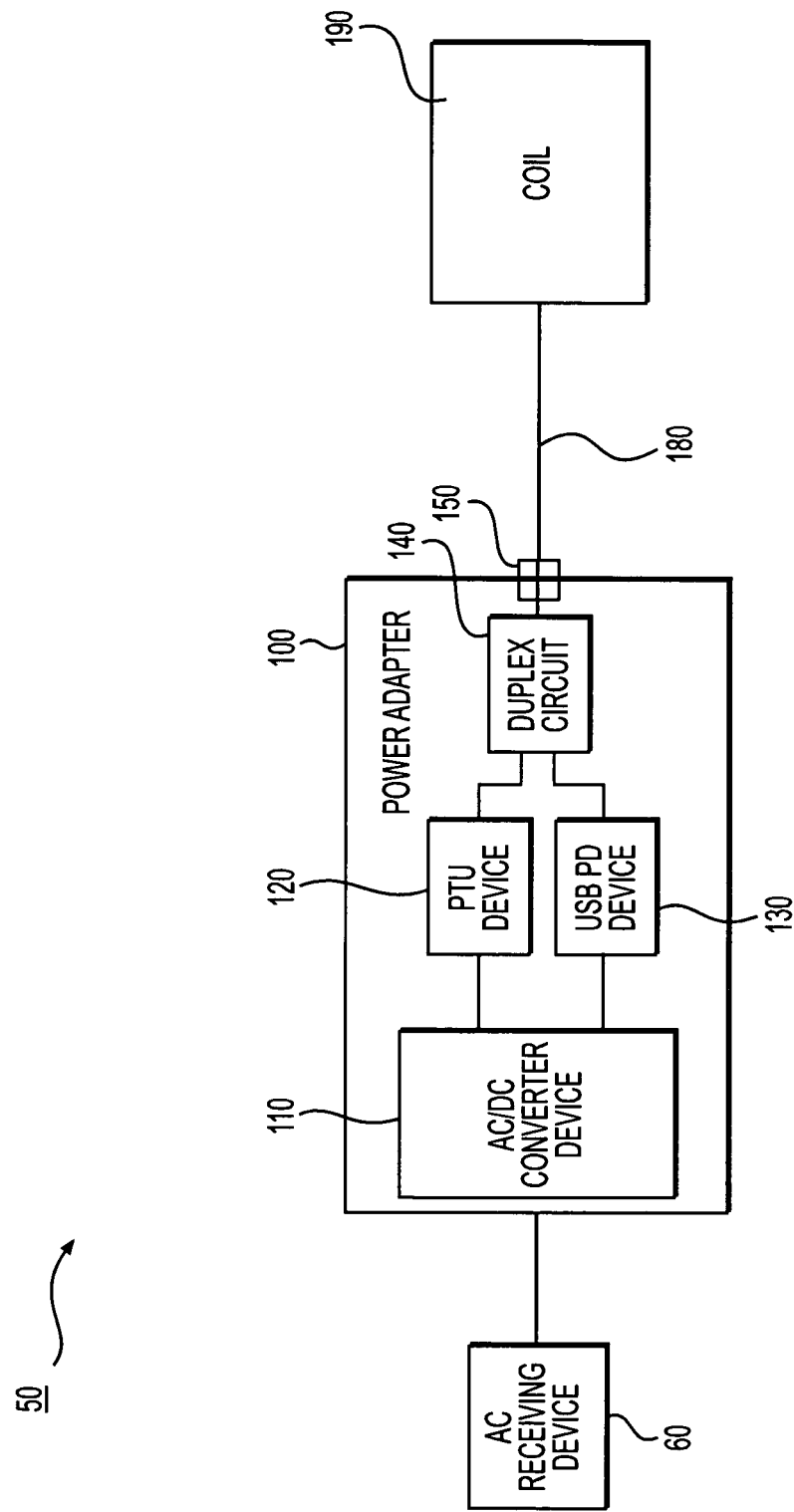
FIG. 2 shows a charging system according to an example embodiment.

FIG. 2 shows a charging system according to an example embodiment. Other embodiments and configurations may also be provided.

FIG. 2 shows a charging system 50 that includes an alternate current (AC) receiving device 60, a power adapter 100, a cable 180 (or shielded coil) and a coil 190 (or induction coil). Other components may also be part of the charging system.

The AC receiving device 60 may receive an AC voltage, such as from a plug outlet or other external power source. The AC receiving device 60 may provide an AC voltage (or AC signal) to the power adapter 100.

The power adapter 100 may be a single physical structure that includes an AC/DC (alternate current/direct current) converter device 110, a PTU (power transmitting unit) device 120 (or first power device), a USB PD (Universal Serial Bus Power Delivery) device 130 (or second power device), a duplex circuit 140 and a jack 150 (or output jack). Other components may also be provided.

The power adapter 100 may provide power to charge an electronic device (both wired and wirelessly). In at least one embodiment, the power adapter 100 may provide a signal having a proper power frequency (such as 6.78 MHz (for wireless charging of an electronic device). In at least one embodiment, the power adapter 100 may provide a DC signal (for a wired charge of an electronic device). In at least one embodiment, both the wireless RF signal and the DC signal may both be provided simultaneously to the jack 150 (or power jack). In at least one embodiment, the RF signal and the DC signal may be independently produced based on what is attached to the jack 150.

The power adapter 100 may provide a proper power frequency signal (for a wireless charging) by using the PTU device 120. The power adapter 100 may provide the DC signal (for a wired charge) by using the USB PD device 130 (or USB PD power supply). Accordingly, the power adapter 100 may be a universal power adapter. In at least one embodiment, the universal power adapter may be provided within a single structure or a single chassis.

The power adapter 100 may include the jack 150 to provide wireless charging via the coil 190 (or coils) and/or to provide a wired charging.

In at least one embodiment, the jack 150 may be a USB Type-C jack (or USB Type-C plug). The cable 180 may connect to the USB type-C jack in order to provide an electrical connection between the power adapter 100 and the coil 190 (for wireless charging) and/or an electrical connection between the power adapter 100 and an electronic device (for wired charging).

The coil 190 may be an induction coil to provide a magnetic induction wireless charging field. The coil 190 may be a coil made of copper wire, etc., for example. The coil 190 may also be referred to as a PTU coil.

The AC/DC converter device 110 may receive an alternate current (AC) signal from the AC receiving device 60. The AC/DC converter device 100 may convert the AC voltage to a direct current (DC) voltage (or DC signal).

The DC voltage may be provided to the PTU device 120 for performing wireless charging. Before the output (i.e., output jack) of the power adapter 100 is properly connected to the coil 190 through the shielded cable 180, the unterminated jack may present an impedance of close to an open circuit at the wireless charging signal frequency, and the PTU device 120 may remain in a sleep/idle mode. When a coil 190 is connected to the output jack 150 of the power adapter 100, the PTU device 120 may detect an impedance near short circuit at the wireless charging signal frequency, then the PTU device 120 may enter a low power mode by sending periodic beacon signals to the coil 190 through the output jack 150 and the shielded cable 180. The PTU device 120 may receive the DC voltage from the AC/DC converter device 110, and provide a signal having the proper transmission frequency, such as 6.78 MHz. When a power receiving unit (PRU) is provided at the PTU coil, the PTU device 120 may detect an impedance change and start communicating with the PRU either in-band through modulation of the charging signal or out-of-band through radios (e.g. BLE) to exchange charging parameters and then start power transfer.

The beacon signals may be sent by the PTU device 120 to the coil 190 in order to detect the impedance of the PRU, or the beacon signal may be used to detect the impedance change that occurs on the coil 190.

In a 4wp device, communication may occur between the PRU and the PTU through Bluetooth low energy (BLE). However, other types of communication may occur between the PTU and PRU using load modulation (i.e., toggling the load presented to the PTU to realize a communication function).

The signal output from the PTU device 120 may be provided to the duplex circuit 140 (or duplex device). The duplex circuit 140 may provide the signal to the jack 150. The duplex circuit 140 may provide the DC voltage (provided by the USB PD device 130) and the wireless charging signal (provided by the PTU device 120) and provide the signals/voltages to the jack 150 (or power output jack). An output voltage is provided from the duplex circuit 140 to the jack 150. The output voltage is provided from the jack 150 to the cable 180 and then to the coil 190. The coil 190 may then provide wireless charging to the electronic device by providing a wireless charging field.

The DC voltage may be provided from the AC/DC converter device 110 to the USB PD device 130 when wired charging is to be performed to an electronic device (such as an a4wd device). The presence/connection of the power adapter 100 to a device that uses wired charging may be detected based on a reduction in DC resistance. The USB PD device 130 may perform operations for providing the DC voltage (or DC signal) for wired charging. The detection mechanism and negotiation of power capabilities may be based on USB-PD procedures.

The DC signal, output from the USB PD device 130, may be provided to the duplex circuit 140. The duplex circuit 140 may provide the signal to the jack 150.

As discussed below, in at least one embodiment, the duplex circuit 140 may allow the signal (such as an RF signal) from the PTU device 120 to pass through to the jack 150 while blocking the DC signal (provided by the USB PD device 130) from feeding back to the PTU device 120. The duplex circuit 140 may consist of passive components that automatically and naturally provide isolation between the PTU device 120 and the USB PD device 130 (or USB PD power supply). In at least one embodiment, the duplex circuit 140 may allow the DC signal from the USB PD device 130 to pass through to the jack 150 while blocking the RF signal (generated by the PTU device 120) from reaching the USB PD device 130.

A signal (DC or RF) may be provided from the duplex circuit 140 to the jack 150. The signal may be provided along the cable 180 to either the coil 190 (for wireless charging) or an electronic device (for wired charging).

The USB Type-C cable may provide a duplex wireless charging signal on the USB PD DC lines. The universal power adapter may provide both wired and wireless power transfer capability. The universal power adapter may allow a user an option to connect to a wireless charging PTU coil (for wireless charging of a4wp enabled devices), and to directly plug into a USB Type C PD enabled device in order to perform wired charging.

Embodiments may provide a split form factor design for a wireless charging system. Embodiments may provide more flexibility of a design for a wireless charging mat to achieve a thin charging mat design since the coil module (or coil section) may be independent of the PTU circuit board module (or circuit board section).

Additionally, thermal issues may be reduced or resolved with respect to the wireless charging mat (in a split configuration with the circuit board) as compared to a one piece design (in a one-piece chassis) for the charging module (or charging mat) and the circuit board (or circuit board module).

The USB Type C cable may be an interconnect between the coil (of the charging module) and the PTU circuit board (or the circuit module). The USB Type C cable may provide a minimum performance impact to the wireless charging system due to physical separation of the coil module (or charging module) and the circuit module.

The cable 180 may be a shielded cable structure that conforms to USB Type C devices. The cable 180 may provide electromagnetic interference/radio frequency interference (EMI/RFI) shielding of the wireless charging signal. The cable 180 may have a low variation in parasitic capacitance due to position changes between the PTU device 120 (or circuit module) and the coil 190 (or PTU coil module).

The power adapter 100 may combine the USB PD device 130 and the PTU device 120 (or a4wp wireless charging PTU) into a single universal power adapter having a common USB Type C jack 150. This may provide flexibility for transitioning from a wire charging to a non-wire charging (or wireless charging) without using redundant hardware.

Figure 3:
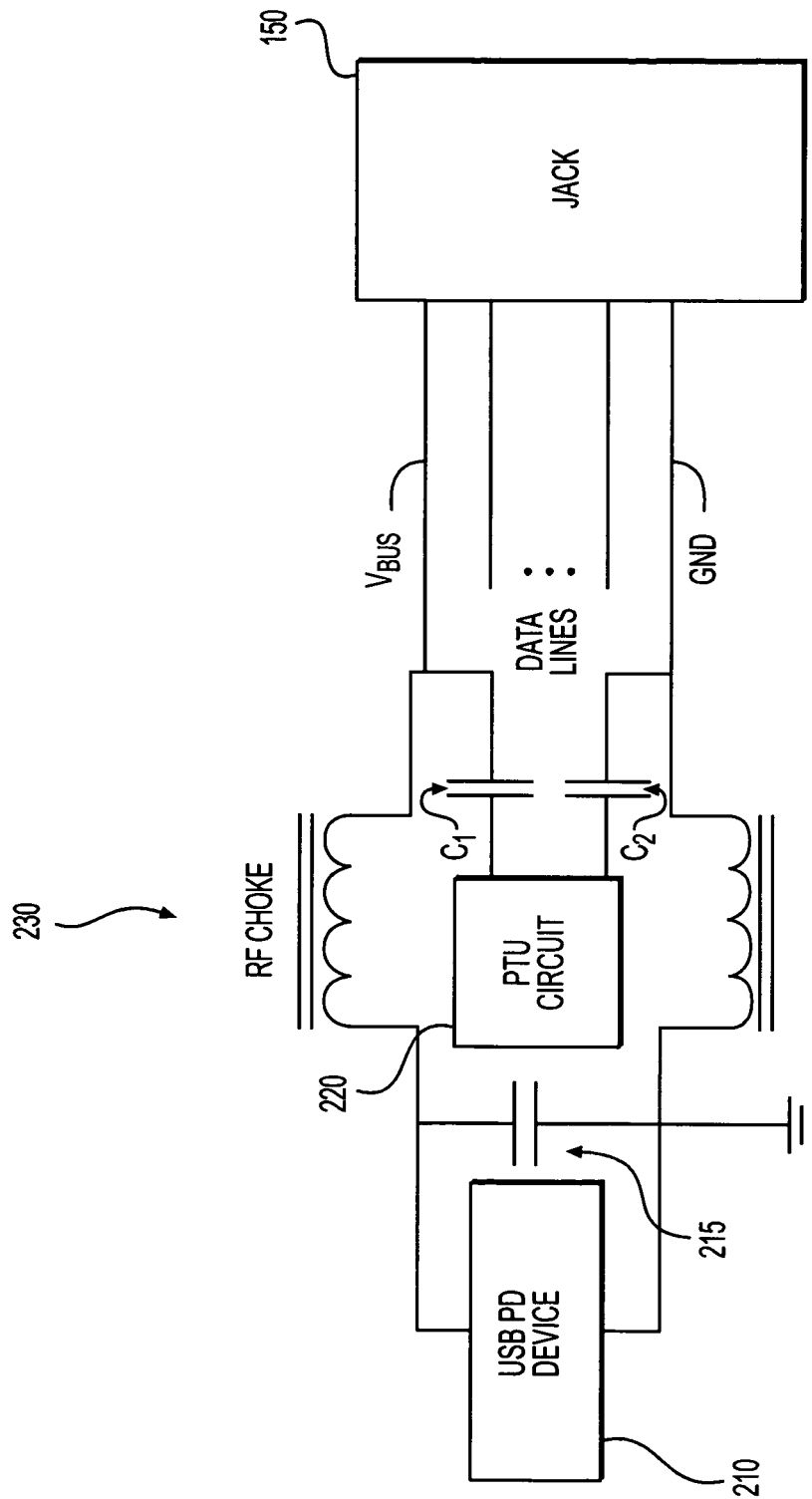
FIG. 3 shows components of a power adapter according to an example embodiment.

FIG. 3 shows components of a power adapter for wired charging and wireless charging according to an example embodiment. Other embodiments and configurations may also be provided.

More specifically, FIG. 3 shows the jack 150 that receives both the DC signal (from the USB PD device) and the wireless charging signal or RF signal. For example, FIG. 3 shows a USB PD device (or USB power supply) that provides a DC voltage from the USB PD device 130.

FIG. 3 also shows a PTU circuit 220 that provides a wireless charging signal (RF signal) from the PTU device 120.

FIG. 3 also shows an RF choke 230, a capacitor 214, and tuning capacitors C1, C2. The RF choke 230 may create a high impedance at a wireless charging frequency, which may effectively block the wireless charging signal and prevent the wireless charging signal from feeding back to the USB PD device (or USB PD power supply). The power adapter 100 may have a very small DC resistance, which may allow the DC output of the USB PD device 210 (or USB PD power supply) to pass through without significant loss. The tuning capacitors C1, C2 may also serve two purposes, namely to help tune the resonator to resonance at the wireless charging frequency when the resonator is plugged into the output jack 150, and to serve as a DC block to prevent the DC output from the USB PD device 210 for feeding back to the PTU circuit 220 (or wireless charging PTU).

The DC signal (DC voltage) may be output from the USB PD device 210 (or USB PD power supply). The DC signal may pass through the RF choke 230 to a Vbus line and a ground (GND) line. The DC signal may be provided to the jack 150.

The wireless charging signal (RF signal) may be provided from the PTU circuit 220, through the tuning capacitors C1, C2 and to the Vbus line and the GND line. The wireless charging signal may be provided to the jack 150.

FIG. 3 shows the combined USB Type C jack that carries both a DC signal (such as the USB PD signal) and the wireless charging signal (such as a A4WP wireless charging signal). The wireless charging signal may be a 6.78 MHz wireless charging signal. The wireless charging signal and the DC signal (the USB PD charging signal) may be duplexed onto the same USB Type C jack, where the Vbus line and the GND line carry both the wireless charging signal (RF signal) and the DC signal (from the USB PD device 210 or the USB PD power supply). The RF choke 230 and the tuning capacitor C1, C2 act as a bias Tee and combine the RF signal and the DC signal while providing isolation between the PTU circuit 220 and the USB PD device 210 (or power supply device).

Figure 4:
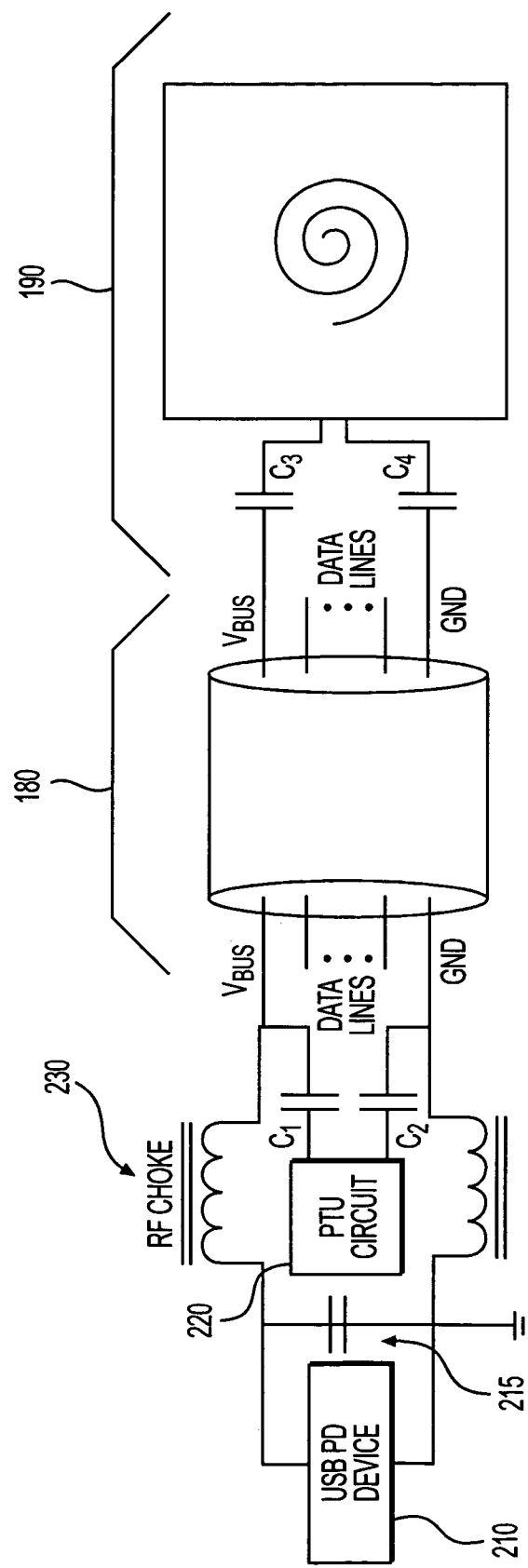
FIG. 4 shows components of the power adapter, the cable and the coil according to an example embodiment.

FIG. 4 shows components of the power adapter, the cable and the coil according to an example embodiment. Other embodiments and configurations may also be provided.

More specifically, FIG. 4 shows the wireless charging signal (RF signal) may pass through the cable 180 to the coil 190, and the DC signal may be blocked by tuning capacitors C3, C4. The tuning capacitors C3, C4 may be part of the coil 190 (or coil module).

As shown in FIG. 4, when the jack 150 is connected to the coil 190 (such as a a4wp PTU coil) through the cable 180 (such as a USB Type C cable), then the RF current may be carried by the Vbus line and the GND line in the USB Type C cable to the PTU coil, while the DC voltage (or DC bias) is blocked by the tuning capacitors C3,C4 on the coil side of the cable 180. The blocking of the DC signal (or DC bias) and allowing the RF signal (or RF current) to pass through to the coil 190 may occur automatically (i.e., naturally) for wireless charging.

Figure 5:
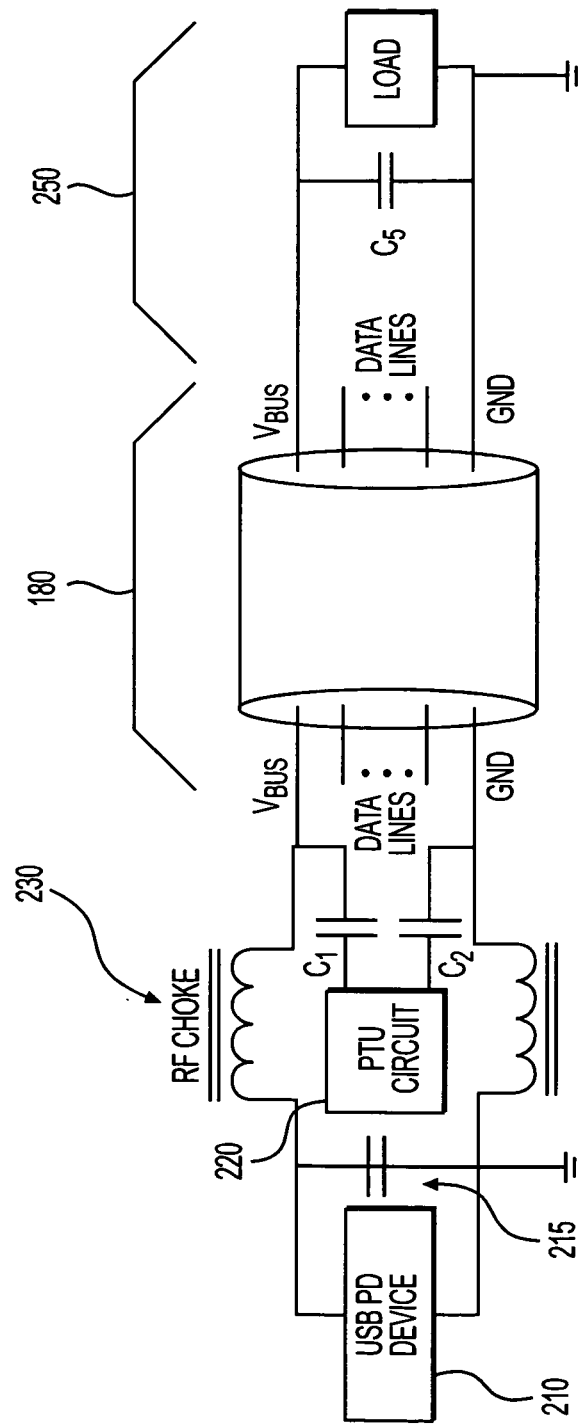
FIG. 5 shows components of the power adapter, the cable and a load according to an example embodiment.

FIG. 5 shows components of the power adapter, the cable and a load according to an example embodiment. Other embodiments and configurations may also be provided.

More specifically, FIG. 5 shows the DC signal (or DC voltage) passing through the cable 180 to a load 250, and the wireless charging signal (or RF signal) being blocked (or shorted) by decoupling capacitor C5 in parallel with the load 250. The load 250 may represent a load at an electronic device. In at least one embodiment, the load 250 may be a battery in the electronic device, and the DC voltage may be provided to the battery of the electronic device.

FIG. 5 shows the power adapter is connected to the load 250 (such as a USB PD DC load) via the cable 180. The load 250 may be automatically (or naturally) powered by the USB PD device 210 (or USB PD power supply), and the wireless charging signal (the a4wp current) carried by the Vbus line and the GND line may be shorted to ground by the decoupling capacitor C5 at a DC input of the electronic device. The decoupling capacitor C5 may be provided at the input of the electronic device, and the decoupling capacitor C5 may be provided between the Vbus line and the GND line. The decoupling capacitor C5 may be a large capacitor to bypass high frequency noise. Accordingly, at the high frequency (including wireless charging frequency), the decoupling capacitor C5 may present a very low impedance such that the high frequency signal does not reach the load.

The wireless charging signal (or a4wp RF signal) may correspond to a current source, and thus a short circuit to ground may automatically (or naturally) terminate the PTU circuit without impact to its function. Upon detection of a shorted RF path connected to the output jack, the PTU circuit 220 may choose to go to a low power state to conserve energy, while periodically sending out beacon signals to detect change in load condition at the wireless charging frequency.

The PTU circuit 220 may detect RF path load conditions based on any one of different methods. For example, the PTU circuit 220 may detect and measure the current through and voltage across the connector (or cable)/coil. The periodic beacon may be generated by the PTU circuit based on the a4wp specification.

Embodiments may provide an electronic device that has a universal power adapter for wired and wireless charging through a USB Type C cable to either a PTU coil or a USB PD DC load (i.e., a battery on an electronic device). The power adapter may automatically (or naturally) provide either RF or DC current without impacting other functions of the power adapter.

Embodiments may provide several different usage scenarios of a split form factor design for a wireless charging mat. As one example, the circuit module (containing the PTU circuit board chassis) may be remote from a user and thus a skin temperature limit may not be relevant (since touching of the wireless charging mat may not occur). Accordingly, the charging module (with the PTU coil) may be provided at a specific location (such as under a table) and the controller module (with the PTU circuit board) may be movable on a top of a table, for example. This may be allowed in part due to the retractable cable.

As discussed above, the cable 180 may be a shielded cable such as a USB Type C coil. However, the shielded cable may also be a USB Type A/B cable that supports USB PD.

Figure 6:
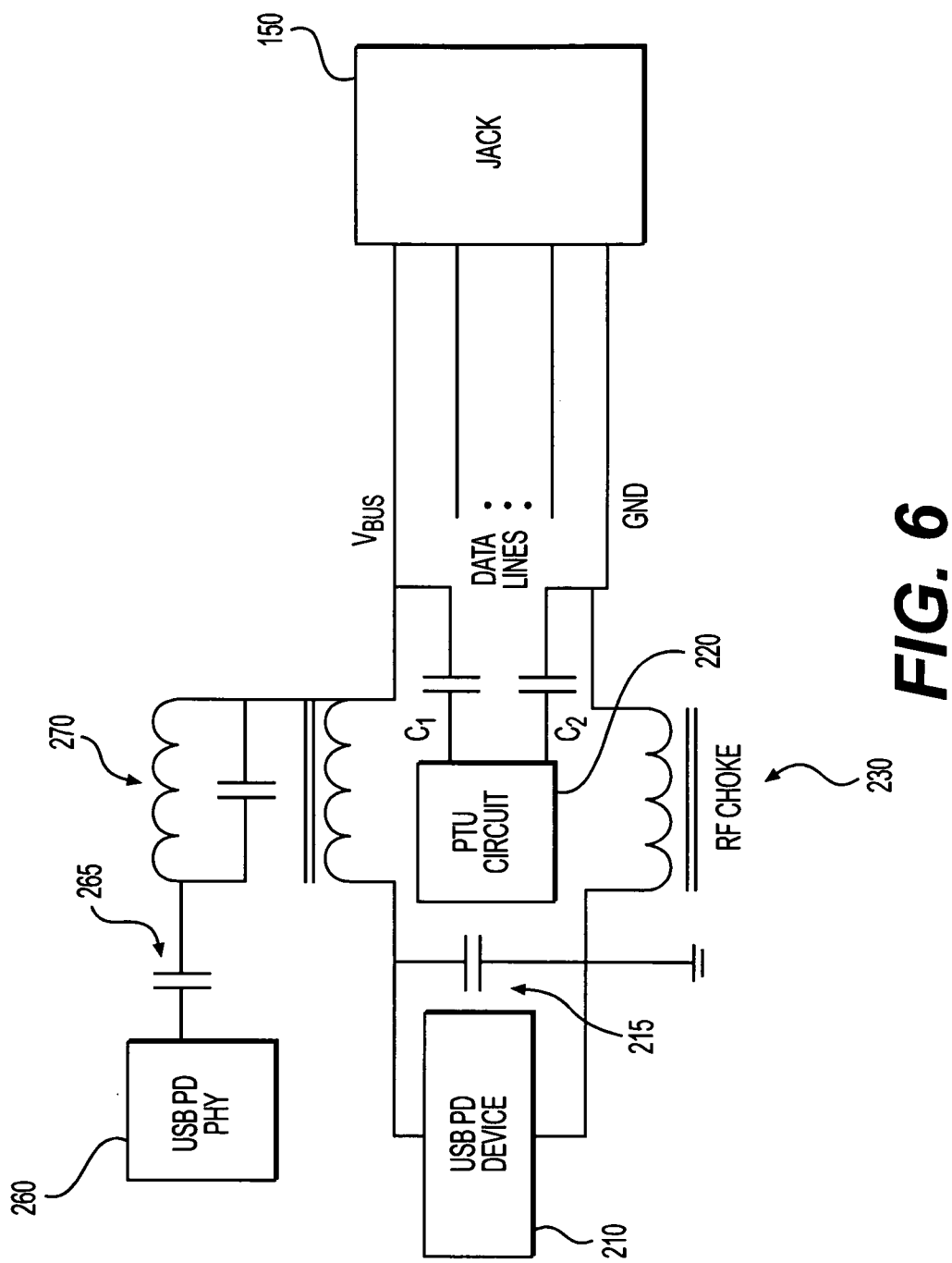
FIG. 6 shows components of a power adapter according to an example embodiment.

FIG. 6 shows components of the power adapter according to an example embodiment. Other embodiments and configurations may also be provided.

More specifically, FIG. 6 shows an embodiment of USB PD with USB PD physical layer (PHY) 260, where a high frequency signal may be required to communicate between the USB PD device and the device being charged. A proper isolation between the USB PD PHY and the wireless charging PTU may be required. The USB PD PHY 260 may be a physical layer that handles the physical layer protocol communication between two USB PD devices.

The USB PD PHY 260 may be connected to a capacitor 265 and to a notch filter 270 (i.e., a 6.78 MHz notch filter). The notch filter 270 may be coupled to the RF choke 230.

The USB PD PHY 260 may provide a 23.2 MHz signal that passes through the notch filter 270, which filters out the 6.78 MHz wireless charging signal while letting the 23.2 MHz USB PD PHY signal to pass through and duplex onto the $V_{BUS}$ line. One end of the notch filter 270 may be connected to the USB PD PHY 260 while the other end of the notch filter 270 is connected to the Vbus line. Different filters (such as band pass, high pass or twin-Tee notch filters) may be used in place of the notch filter 270.

Figure 7:
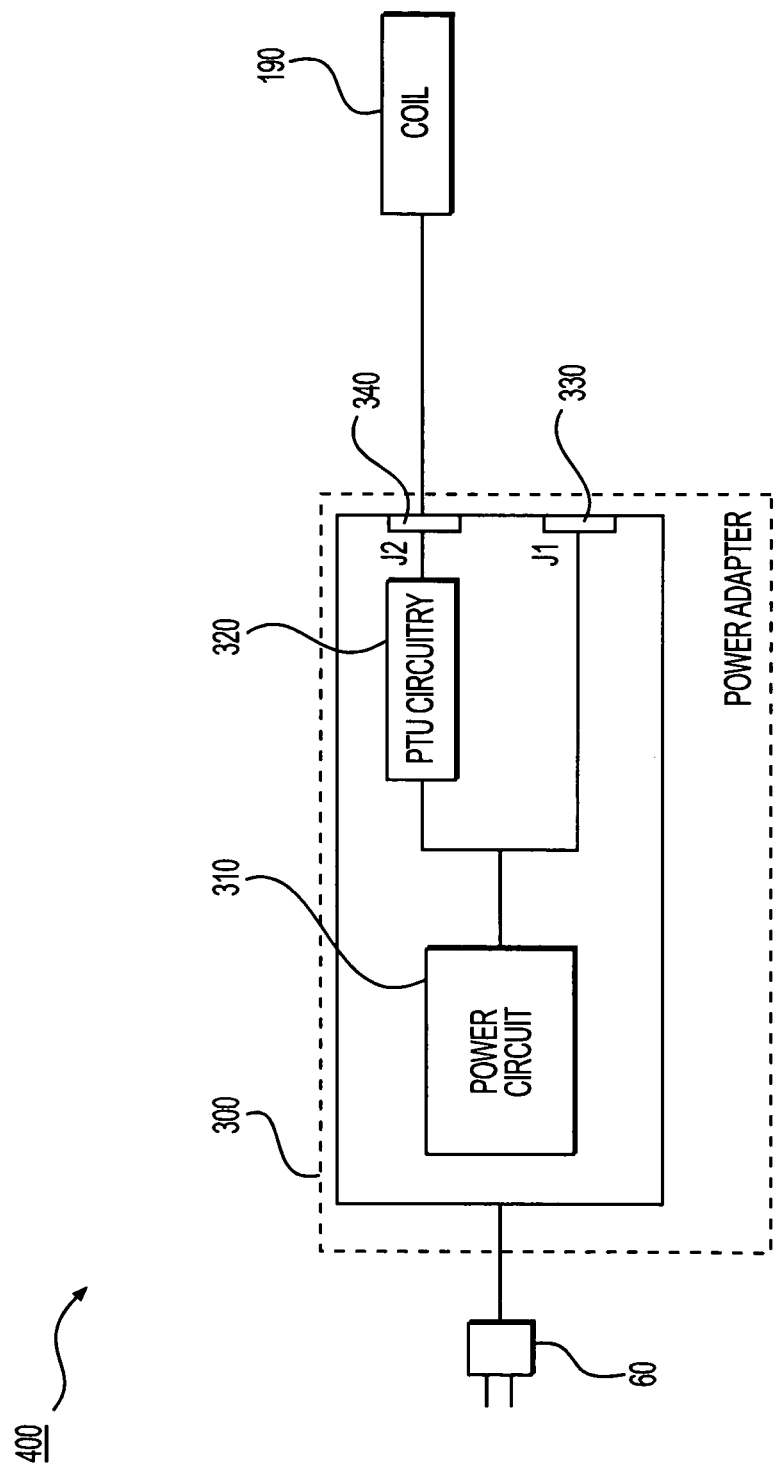
FIG. 7 shows a charging system according to an example embodiment.

FIG. 7 shows a charging system according to an example embodiment. Other embodiments and configurations may also be provided.

More specifically, FIG. 7 shows a charging system 400 that includes the AC receiving device 60, a power adapter 300, and the coil 190. In this embodiment, the power adapter 300 includes a power circuit 310 that receives AC power from the AC receiving device 60 and provides a DC voltage. The power circuit 310 may be a DC power supply that complies with USB-PD standard and/or protocol.

The power circuit 310 provides a DC signal (or DC voltage) as an output signal. The DC signal may be provided to a first jack 330 for charging an electronic device. For example, the electronic device may be connected by wire to the first jack 330. The DC voltage may be provided to the first jack 330 and then to the electronic device. Additionally, the DC voltage may be provided from the power circuit 310 to PTU circuitry 320. The PTU circuitry 330 may provide a proper power transmission frequency signal (such as 6.78 MHz). This may be a wireless charging signal. The wireless charging signal may be provided to a second jack 340. The coil 190 may be connected to the second jack 340 by a cable (such as the cable 180). Accordingly, the coil 190 may provide a wireless charging field based on signal received via the second jack 340.

The power adapter 300 may separately provide a wireless charging output and a wired charging output through separate USB Type C jacks.

Figure 8:
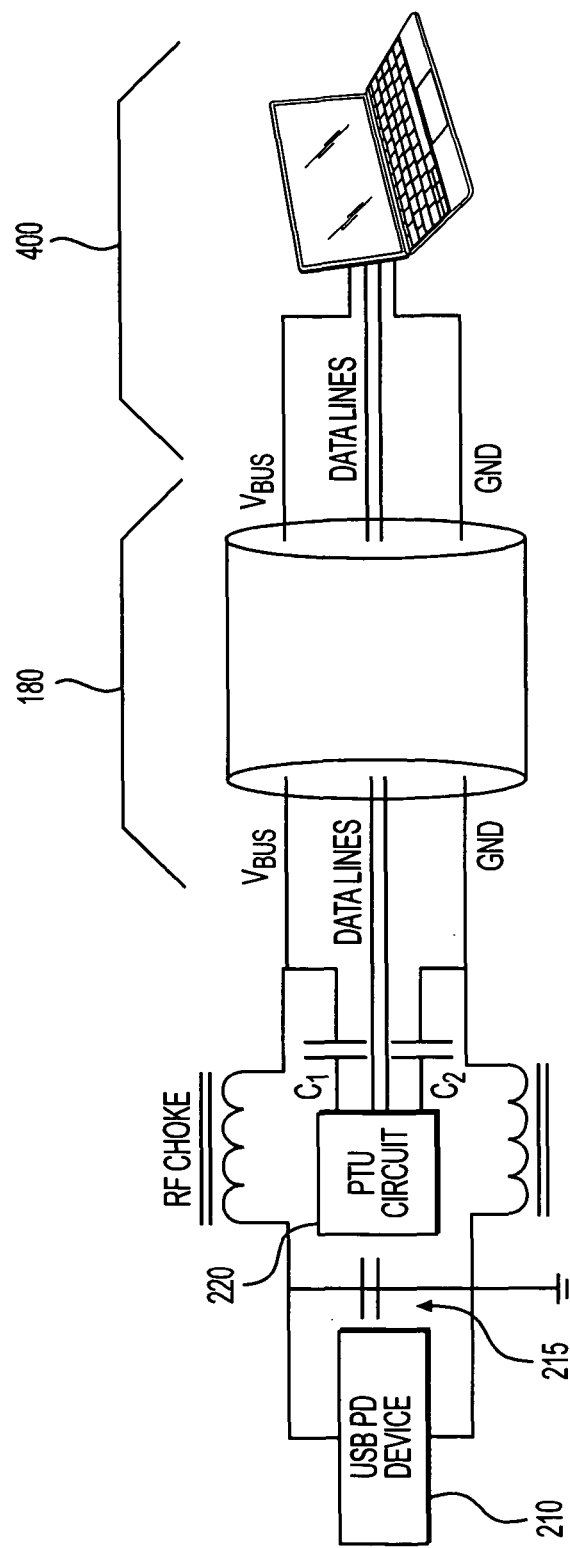
FIG. 8 shows an electronic device connected to a power adapter according to an example embodiment.

FIG. 8 shows an electronic device connected to a power adapter according to an example embodiment. Other embodiments and configurations may also be provided.

More specifically, FIG. 8 shows that an electronic device 400 may be connected to the cable 180 in order to provide updating of data for the PTU device 220. The electronic device 400 may be a computer system, for example.

The electronic device 400 may be connected to data lines of the cable 180, which may be a USB Type-C cable. Data lines of a microcontroller of the PTU circuit may be connected in order to update firmware or software from the electronic device.

The following examples pertain to further embodiments.

Example 1 is an electronic system comprising: an alternate current/direct current (AC/DC) converter device to receive an AC signal and to provide a DC signal based on the AC signal; a first power device to receive the DC signal and to provide a first output signal based on the DC signal, the first output signal to be a wireless charging signal; a second power device to receive the DC signal and to provide a second output signal based on the DC signal; and a jack to provide both the first output signal and the second output signal.

In Example 2, the subject matter of Example 1 can optionally include a power adapter that includes the AC/DC converter device, the first power device, and the second power device.

In Example 3, the subject matter of Example 1 and Example 2 can optionally include an alternate current (AC) receiving device to receive an AC signal from an external power source, and to provide the AC signal to the AC/DC converter device.

In Example 4, the subject matter of Example 1 and Example 2 can optionally include a charging module that is physically separated from the power adapter.

In Example 5, the subject matter of Example 1 and Example 4 can optionally include the charging module includes a coil to provide a wireless charging field.

In Example 6, the subject matter of Example 1 and Example 5 can optionally include the coil is a copper coil.

In Example 7, the subject matter of Example 1 and Example 5 can optionally include the coil is an induction coil to provide the wireless charging field.

In Example 8, the subject matter of Example 1 and Example 5 can optionally include the coil includes at least one tuning capacitor to block the second output signal.

In Example 9, the subject matter of Example 1 and Example 5 can optionally include a cable to couple to the charging module and to couple to the power adapter.

In Example 10, the subject matter of Example 1 and Example 9 can optionally include the cable is a universal serial bus (USB) Type-C cable.

In Example 11, the subject matter of Example 1 and Example 9 can optionally include the cable is a retractable cable.

In Example 12, the subject matter of Example 1 and Example 9 can optionally include the second output signal is a DC signal to charge an electronic device to couple to the cable.

In Example 13, the subject matter of Example 1 can optionally include the wireless charging signal is shorted by a decoupling capacitor.

In Example 14, the subject matter of Example 1 can optionally include the second output signal is a DC signal to charge an electronic device to couple to the jack.

In Example 15, the subject matter of Example 1 can optionally include the wireless charging signal is a 6.78 MHz signal.

In Example 16, the subject matter of Example 1 can optionally include the second power device is a universal serial bus (USB) power delivery (PD) device.

In Example 17, the subject matter of Example 1 can optionally include the first power device is a power transmitting unit (PTU) device.

In Example 18, the subject matter of Example 1 and Example 17 can optionally include the first power device to determine a change of impedance, and the first power device to communicate with an electronic device in response to determining the change of impedance.

In Example 19, the subject matter of Example 1 can optionally include the jack to receive both the first output signal and the second output signal.

In Example 20, the subject matter of Example 1 can optionally include the power adapter is a universal power adapter to provide the wireless charging signal and a wired charging signal.

Example 21 is an electronic apparatus comprising: a first power device to receive a direct current (DC) signal based on an external power supply, and the first power device to provide a first output signal based on the DC signal, the first output signal to be a wireless charging signal; a second power device to receive the DC signal based on the external power supply, and the second power device to provide a second output signal based on the DC signal; and a jack to receive the first output signal and the second output signal, and an electronic device to receive power via the jack based on one of the first output signal and the second output signal.

In Example 22, the subject matter of Example 21 can optionally include an alternate current/direct current (AC/DC) converter device to receive an alternate current (AC) signal and to provide the DC signal based on the DC signal.

In Example 23, the subject matter of Example 21 and Example 22 can optionally include a power adapter that includes the AC/DC converter device, the first power device, and the second power device.

In Example 24, the subject matter of Example 21 and Example 23 can optionally include the power adapter is a universal power adapter to provide a wireless charging signal and a wired charging signal.

In Example 25, the subject matter of Example 21 can optionally include the second output signal is a DC signal to charge the electronic device.

In Example 26, the subject matter of Example 21 can optionally include the wireless charging signal is a 6.78 MHz signal.

In Example 27, the subject matter of Example 21 can optionally include the second power device is a universal serial bus (USB) power delivery (PD) device.

In Example 28, the subject matter of Example 21 can optionally include the first power device is a power transmitting unit (PTU) device.

In Example 29, the subject matter of Example 21 and Example 28 can optionally include the first power device to determine a change of impedance, and the first power device to communicate with the electronic device in response to determining the change of impedance.

In Example 30, the subject matter of Example 21 can optionally include the jack to receive both the first output signal and the second output signal.

Example 31 is an electronic system comprising: receiving means for receiving an alternate current (AC) signal and providing a direct current (DC) signal based on the AC signal; first power means for receiving the DC signal and for providing a first output signal based on the DC signal, the first output signal to be a wireless charging signal; second power means for receiving the DC signal and for providing a second output signal based on the DC signal; and connection means for providing both the first output signal and the second output signal.

In Example 32, the subject matter of Example 31 can optionally include a power adapter that includes the receiving means, the first power means, and the second power means.

In Example 33, the subject matter of Example 31 and Example 32 can optionally include the power adapter to provide a wireless charging signal and a wired charging signal.

In Example 34, the subject matter of Example 31 and Example 32 can optionally include an alternate current (AC) receiving device to receive an AC signal from an external power source, and to provide the AC signal to the receiving means.

In Example 35, the subject matter of Example 31 and Example 32 can optionally include a charging module that is physically separated from the power adapter.

In Example 36, the subject matter of Example 31 and Example 35 can optionally include the charging module includes charging means for providing a wireless charging field.

In Example 37, the subject matter of Example 31 and Example 36 can optionally include the charging means is a coil.

In Example 38, the subject matter of Example 31 and Example 37 can optionally include the coil is a copper coil.

In Example 39, the subject matter of Example 31 and Example 37 can optionally include the coil is an induction coil to provide the wireless charging field.

In Example 40, the subject matter of Example 31 and Example 39 can optionally include the coil includes at least one tuning capacitor to block the second output signal.

In Example 41, the subject matter of Example 31 and Example 37 can optionally include a cable to couple to the charging module and to couple to the power adapter.

In Example 42, the subject matter of Example 31 and Example 41 can optionally include the cable is a universal serial bus (USB) Type-C cable.

In Example 43, the subject matter of Example 31 and Example 41 can optionally include the cable is a retractable cable.

In Example 44, the subject matter of Example 31 and Example 41 can optionally include the second output signal is a DC signal to charge an electronic device to couple to the cable.

In Example 45, the subject matter of Example 31 can optionally include the wireless charging signal is shorted by a decoupling capacitor.

In Example 46, the subject matter of Example 31 can optionally include the second output signal is a DC signal to charge an electronic device to couple to the connection means.

In Example 47, the subject matter of Example 31 can optionally include the wireless charging signal is a 6.78 MHz signal.

In Example 48, the subject matter of Example 31 can optionally include the second power means is a universal serial bus (USB) power delivery (PD) device.

In Example 49, the subject matter of Example 31 can optionally include the first power means is a power transmitting unit (PTU) device.

In Example 50, the subject matter of Example 31 and Example 49 can optionally include the first power means for determining a change of impedance, and the first power means for communicating with an electronic device in response to determining the change of impedance.

In Example 51, the subject matter of Example 31 can optionally include the connection means for receiving both the first output signal and the second output signal.

In Example 52, the subject matter of Example 31 can optionally include the connection means is a jack.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power apparatus comprising:
   an alternate current/direct current (AC/DC) converter device to receive an AC signal and to provide a DC signal based on the AC signal;
   a first power device coupled with the AC/DC converter device to receive the DC signal and to provide a first output signal based on the DC signal, the first output signal to be a wireless charging signal;
   a second power device coupled with the AC/DC converter device to receive the DC signal and to provide a second output signal based on the DC signal; and
   a jack coupled with the first and second power devices to output both the first output signal and the second output signal, the first output signal being usable by an externally disposed wireless charging module when the wireless charging module is removably coupled with the jack in a manner that blocks the second output signal, and the second output signal being usable by an externally disposed load to be charged when the load to be charged is removably coupled with the jack in a manner that blocks the first output signal.

2. The power apparatus of claim 1, further comprising an alternate current (AC) receiving device to receive an AC signal from an external power source, and to provide the AC signal to the AC/DC converter device.

3. The power apparatus of claim 1, wherein the wireless charging module includes a coil to provide a wireless charging field, and a plurality of capacitors to keep the second output signal from reaching the coil.

4. The power apparatus of claim 1, wherein the coil is a copper coil.

5. The power apparatus of claim 1, comprising a power adapter that includes the AC/DC converter device, the first power device, the second power device, and the jack, and further comprising a cable to removably couple the wireless charging module to the power adapter.

6. The power apparatus of claim 5, wherein the cable is a universal serial bus (USB) Type-C cable.

7. The power apparatus of claim 1, wherein the wireless charging signal is a 6.78 MHz signal.

8. The power apparatus of claim 1, wherein the second power device is a universal serial bus (USB) power delivery (PD) device.

9. The power apparatus of claim 1, wherein the power apparatus is a universal power adapter to provide the wireless charging signal and a wired charging signal for selective usage by either the wireless charging module or the load to be charged.

10. An electronic apparatus comprising:
a power adapter having;
a first power device to receive a direct current (DC) signal based on an external power supply, and the first power device to provide a first output signal based on the DC signal, the first output signal to be a wireless charging signal;
a second power device to receive the DC signal based on the external power supply, and the second power device to provide a second output signal based on the DC signal; and
a jack coupled with the first and second power devices to receive and output the first output signal and the second output signal; and
an electronic device coupled with the power adapter via the jack, to receive power via the jack based on one of the first and second output signals and blocking the other one of the first and second output signals.

11. The electronic apparatus of claim 10, wherein the power adapter further comprises an alternate current/direct current (AC/DC) converter device to receive an alternate current (AC) signal and to provide the DC signal based on the DC signal.

12. The electronic apparatus of claim 11, wherein the power adapter is a universal power adapter to provide a wireless charging signal for use by the electronic device when the electronic device is a wireless charging module, and a wired charging signal for use by the electronic device when the electronic device is a load to be charged.

13. A charging apparatus comprising:
power adapter means having;
receiving means for receiving an alternate current (AC) signal and providing a direct current (DC) signal based on the AC signal;
first power means for receiving the DC signal and for providing a first output signal based on the DC signal, the first output signal to be a wireless charging signal;
second power means for receiving the DC signal and for providing a second output signal based on the DC signal;
first and second connector means for respectively providing the first output signal and the second output signal; and
output jack means coupled with the first and second power means for outputting both the first output signal and the second output signal;
wireless charging means for receiving and the wireless charging signal to wirelessly charge an electronic system; and
connection means for coupling the wireless charging means to the output jack means of the power adapter means, blocking the second output signal while allowing the wireless charging signal to be provided to the wireless charging means.

14. The electronic system of claim 13, further comprising an alternate current (AC) receiving device to receive an AC signal from an external power source, and to provide the AC signal to the receiving means.

15. The electronic system of claim 13, wherein the wireless charging means comprises a wireless charging module having a coil to provide a wireless charging field, and the wireless charging signal is a 6.78 MHz signal.

16. The electronic system of claim 13, wherein the output jack means comprises a USB Type C jack.

17. The electronic system of claim 13, wherein the connection means comprises a cable.

* * * * *